(12) United States Patent
Fukui (10) Patent No.: US 9,777,791 B2
(45) Date of Patent: Oct. 3, 2017

(54) SHOCK ABSORBER (71) Applicant: KYB Corporation, Tokyo (JE)

(72) Inventor: Takahiro Fukui, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/917,036

(22) PCT Filed: Oct. 1, 2014

(86) PCT No.: PCT/JP2014/076319
§ 371 (c)(1),
(2) Date: Mar. 7, 2016

(87) PCT Pub. No.: WO2015/053151
PCT Pub. Date: Apr. 16, 2015

(65) Prior Publication Data
US 2016/0215848 A1 Jul. 28, 2016

(30) Foreign Application Priority Data

Oct. 8, 2013 (JP) ................................. 2013-210641

(51) Int. Cl.
*F16F 9/38* (2006.01)
*F16F 9/58* (2006.01)
(Continued)

(52) U.S. Cl.
CPC ................ *F16F 9/38* (2013.01); *B60G 15/06* (2013.01); *F16F 9/58* (2013.01); *F16F 13/06* (2013.01);
(Continued)

(58) Field of Classification Search
CPC .......... F16F 9/38; F16F 9/3207; F16F 9/3235; F16F 9/3242; F16F 2230/0023; B60G 2206/41
See application file for complete search history.

(56) References Cited

U.S. PATENT DOCUMENTS 7,810,619 B2 * 10/2010 Maeda ...................... F16F 9/58
188/322.17
2016/0084336 A1 * 3/2016 Tsunekawa ............. F16F 9/585
188/322.12

FOREIGN PATENT DOCUMENTS

CN 201991990 U 9/2011
DE 102008062902 A1 * 6/2010 ............ F16F 9/3242
(Continued)

OTHER PUBLICATIONS

EPO machine translation, DE 10-2008062902 A1, Jun. 2010.*

*Primary Examiner* — Thomas J Williams
(74) *Attorney, Agent, or Firm* — Rabin & Berdo, P.C.

(57) ABSTRACT

A shock absorber includes: a metal cylindrical outer tube; a rod inserted into the outer tube, the rod being capable of moving in the axial direction; a bump cushion attached to an outer periphery of the rod that protrudes from the outer tube; a synthetic resin bump stopper formed in a cap shape and fitted to one end in the axial direction of the outer tube, the bump stopper being configured to be abutted by the bump cushion during maximum compression; and a sacrificial corrosion part disposed between the outer tube and the bump stopper, the sacrificial corrosion part being configured to contact a metal surface of the outer tube. The sacrificial corrosion part is made of a metal having a higher ionization tendency than the outer tube, and thereby corrosion of members is suppressed.

5 Claims, 5 Drawing Sheets (51) Int. Cl.
  *B60G 15/06* (2006.01)
  *F16F 13/06* (2006.01)
  *F16F 9/32* (2006.01)
(52) U.S. Cl.
  CPC ...... *B60G 2202/32* (2013.01); *B60G 2206/41* (2013.01); *F16F 9/3242* (2013.01); *F16F 2230/0023* (2013.01)

(56) References Cited

FOREIGN PATENT DOCUMENTS

| | | |
|---|---|---|
| JP | 57-107608 U | 7/1982 |
| JP | 61-077505 A | 4/1986 |
| JP | 03-277841 A | 12/1991 |
| JP | 2001-050329 A | 2/2001 |

* cited by examiner

SHOCK ABSORBER

TECHNICAL FIELD

The present invention relates to a shock absorber.

BACKGROUND ART

JP2001-50329A discloses a shock absorber including a bump cushion that is attached to the outer periphery of a rod that protrudes from an outer tube, and a bump stopper made of synthetic resin that is fitted to one end of the outer tube. In this shock absorber, the bump cushion abuts the bump stopper during maximum compression, and thereby the impact at maximum compression is absorbed.

SUMMARY OF INVENTION

Herein, if the outer tube is formed by an iron-based metal, a rust prevention coating is generally applied to the outer peripheral surface of the outer tube. For example, in the case of applying the rust prevention coating by immersion coating, which is inexpensive and easy, a non-coated part is provided on the end of the outer tube on the rod protruding side in order to prevent the coating material from infiltrating into the outer tube. The non-coated part is covered by the bump stopper, but does not impart a rust preventing effect to the synthetic resin bump stopper. Therefore, corrosion progresses at a non-coated portion where the iron-based metal is exposed, and this may lead to a phenomenon in which corrosion products seep out and worsen the outer appearance or cause degradation of the bump stopper.

This phenomenon can occur even if the outer tube is formed by a metal other than iron, and can also occur when implementing rust prevention measures by a method other than coating if it is difficult to perform a rust prevention treatment at the end of the outer tube to which the bump stopper is fitted. Further, if the coating method is changed to, for example, brush coating, electrodeposition coating, powder coating, and the like in order to eliminate the non-coated part of the outer tube, the labor and facilities costs increase, and as a result the manufacturing costs increase.

An object of the present invention is to suppress corrosion of an exposed portion when such a portion at which a metal is exposed is formed at one end of an outer tube to which a bump stopper is fitted.

According to one aspect of the present invention, a shock absorber includes: a metal cylindrical outer tube; a rod inserted into the outer tube, the rod being capable of moving in the axial direction; a bump cushion attached to an outer periphery of the rod that protrudes from the outer tube; a synthetic resin bump stopper formed in a cap shape and fitted to one end in the axial direction of the outer tube, the bump stopper being configured to be abutted by the bump cushion during maximum compression; and a sacrificial corrosion part disposed between the outer tube and the bump stopper, the sacrificial corrosion part being configured to contact a metal surface of the outer tube, wherein the sacrificial corrosion part is made of a metal having a higher ionization tendency than the outer tube.

DESCRIPTION OF EMBODIMENTS

A shock absorber according to an embodiment of the present invention will now be explained below referring to the drawings. When the same reference numeral is used over several drawings, this reference numeral indicates the same part or corresponding parts.

Figure 1:
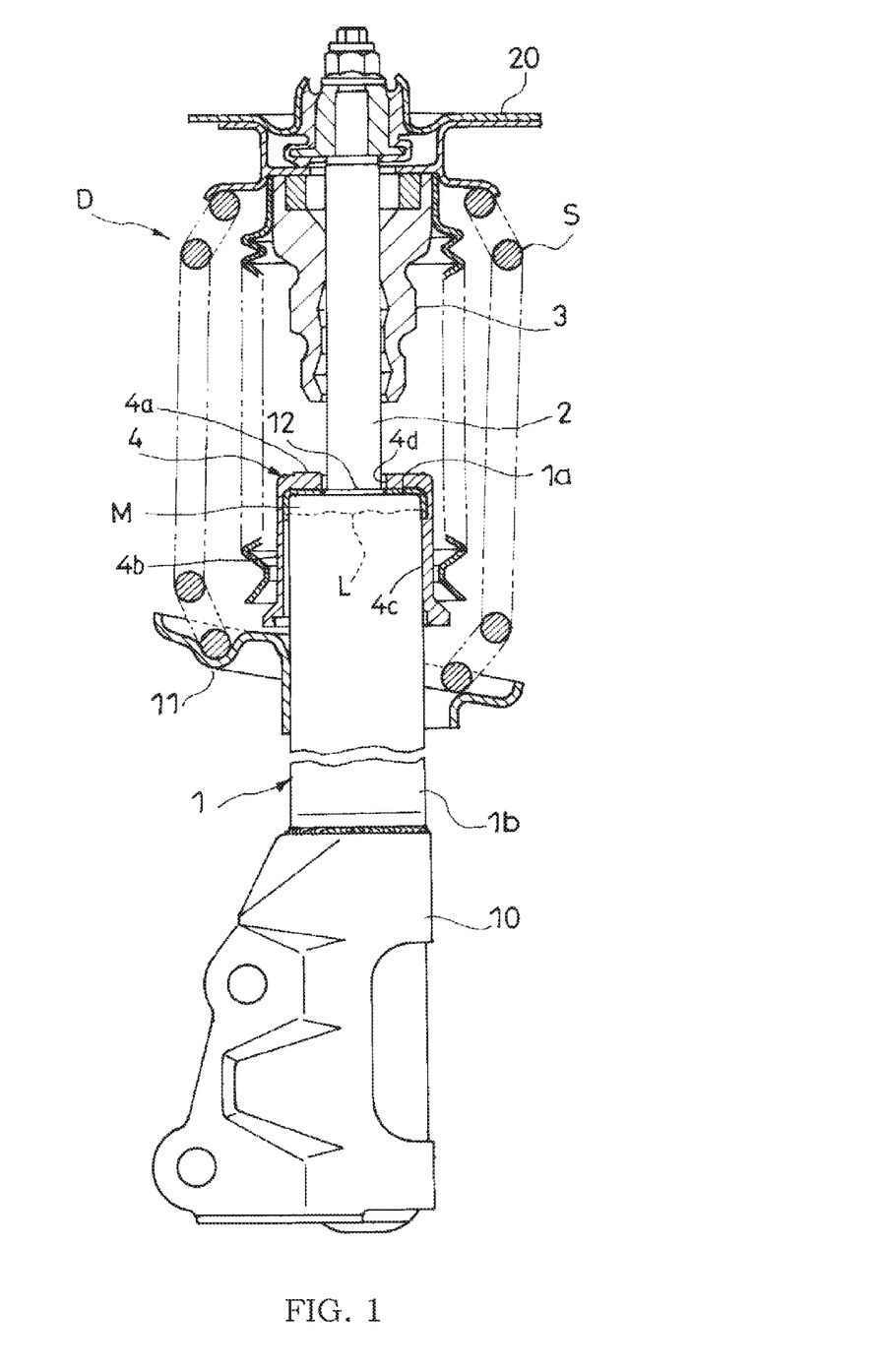
FIG. 1 is a partially cut-away front view of a shock absorber according to an embodiment of the present invention.
Figure 2:
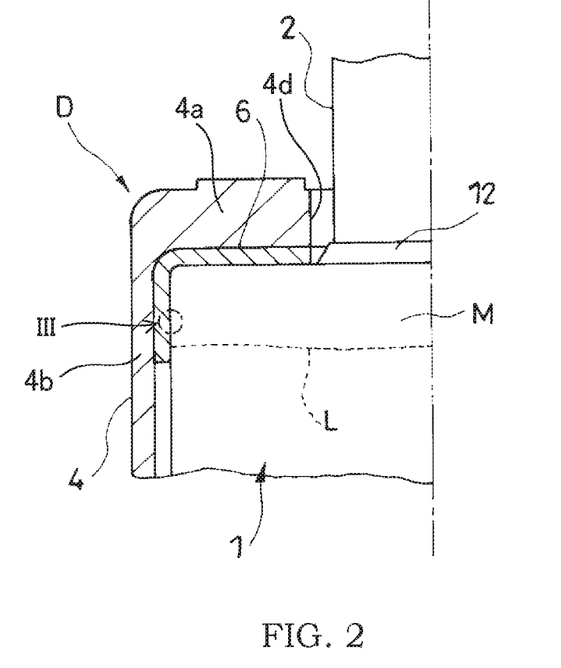
FIG. 2 is an enlarged view of the essential parts of FIG. 1.
Figure 3:
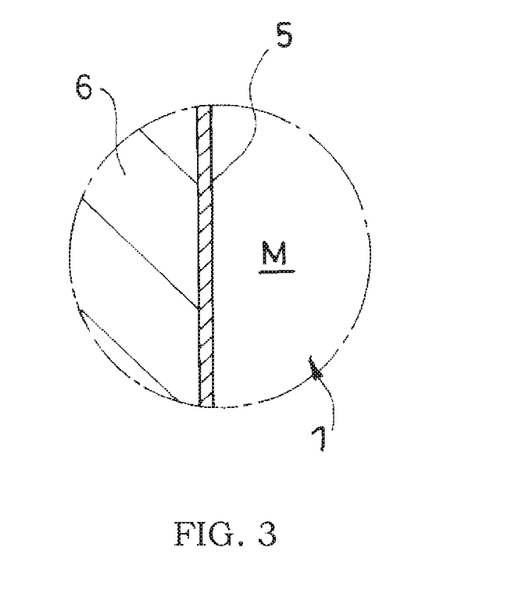
FIG. 3 is an enlarged view of a portion III shown in FIG. 2.

As shown in FIG. 1, a shock absorber D according to the present embodiment includes a metal cylindrical outer tube 1, a rod 2 that is inserted into the outer tube 1 such that it can move in the axial direction, a bump cushion 3 that is attached to the outer periphery of an upper part of the rod 2 that protrudes from the outer tube 1, and a synthetic resin bump stopper 4 that is formed in a cap shape and is fitted to one end in the axial direction of the outer tube 1. During maximum compression of the shock absorber D in which the rod 2 has progressed into the outer tube 1 to the maximum degree, the bump cushion 3 abuts the bump stopper 4, and thereby the impact at maximum compression is absorbed and mitigated. As shown in FIGS. 2 and 3, the shock absorber D further includes a sacrificial corrosion part 5 that is disposed between the outer tube 1 and the bump stopper 4 and contacts a metal surface M of the outer tube 1. The sacrificial corrosion part 5 is a metal having a higher ionization tendency than that of the metal that forms the outer tube 1.

The shock absorber D is interposed between a vehicle body and a vehicle wheel of an automobile. As shown in FIG. 1, in the shock absorber D, the end of the rod 2 that protrudes from the outer tube 1 is connected to the vehicle body side via a vehicle body-side mount 20, and the outer tube 1 is connected to the vehicle wheel side via a bracket 10 that is welded and fixed to the outer periphery of the outer tube 1. Therefore, when impacts from uneven portions on the road surface are input into the vehicle wheel, the rod 2 goes into and out of the outer tube 1 and the shock absorber D extends/contracts. The shock absorber D according to the present embodiment is an upright type in which the rod 2 is connected to the vehicle body side and the outer tube 1 is connected to the vehicle wheel side. The shock absorber D can also be an inverted type in which the rod 2 is connected to the vehicle wheel side and the outer tube 1 is connected to the vehicle body side. Further, the shock absorber D can also be utilized in objects other than an automobile.

Although not concretely illustrated, the shock absorber D further includes a piston that is connected to a lower end of the rod 2 that is inserted into the outer tube 1 and that slidingly contacts an inner peripheral surface of the outer tube 1, two chambers that are partitioned by the piston within the outer tube 1 and that are filled with a working fluid, a passage that establishes communication between the chambers, and a damping valve that imparts resistance to a flow of working fluid that passes through the passage. When the shock absorber D extends/contracts, the working fluid in one of the chambers that is contracted passes through the passage and moves into the other chamber that expands. At this time, the shock absorber D generates a damping force originating from the resistance of the damping valve when the working fluid passes through the passage. As the working fluid, various fluids can be utilized including liquids such as oil, water, aqueous solutions, etc., as well as gases and the like. The shock absorber D can be a so-called double-cylinder type shock absorber that has a cylinder inside the outer tube 1, as well as a double-rod type shock absorber in which the rod 2 protrudes at both sides of the piston.

The absorption and mitigation of impacts during maximum compression is specifically achieved by the conversion of kinetic energy to elastic energy when the bump cushion 3 abuts the bump stopper 4 and elastically deforms during maximum compression of the shock absorber D. The bump cushion 3 is formed by a synthetic resin, rubber, or the like. Alternatively, the bump cushion 3 can also be formed by a coil spring.

The outer tube 1 to which the bump stopper 4 is fitted is formed by an iron-based metal. The bracket 10 and a plate-shaped spring receiver 11 that supports a lower end of a suspension spring S are welded and fixed to the outer periphery of the outer tube 1. Since the outer tube 1 is formed by an iron-based metal, the bracket 10 and the spring receiver 11 can be easily welded to the outer tube 1. After the welding operation, a rust prevention coating is applied to the outer tube 1. The coating method can be any method, but after coating, a portion at which the metal surface M of an iron-based metal or the like is exposed is formed at an upper end part of the outer tube 1. The upper end of the outer tube 1 is caulked on the inside, and presses a seal 12 that plugs the outer periphery of the rod 2 at a caulked part 1a. The non-coated part where the metal surface M is exposed is formed across the caulked part 1a and the upper end of a cylindrical part 1b that is continuous with the caulked part 1a. A dotted line L shown in FIGS. 1, 2, 4, and 6 indicates a boundary between the metal surface M and a coated surfaced (no reference numeral) on the outer periphery of the outer tube 1. An iron-based metal is a metal in which iron is the main component or is pure iron.

The non-coated portion of the outer tube 1 is covered by the bump stopper 4 that is fitted to the outer tube 1. The bump stopper 4 is a cap-shaped member including an annular top part 4a, a cylindrical tube part 4b that stands up on the outer peripheral edge of the top part 4a, and a plurality of ribs 4c that are disposed at intervals in the peripheral direction and extend in the axial direction on the inner periphery of the tube part 4b. A center hole 4d that permits the insertion of the rod 2 is formed at a center part of the top part 4a. The ribs 4c are pressed to the outer peripheral surface of the outer tube 1 when the bump stopper 4 is fitted to the outer tube 1, and inhibit the bump stopper 4 from coming off the outer tube 1. By modifying the protruding amount and thickness of the ribs 4c, the press-fitting load, or in other words the bonding strength between the bump stopper 4 and the outer tube 1, can be easily adjusted. The tube part 4b can also be directly fitted to the outer tube 1 without providing the ribs 4c on the inner periphery of the tube part 4b.

The top part 4a, the tube part 4b, and the ribs 4c are formed integrally by the same synthetic resin. The top part 4a, the tube part 4b, and the ribs 4c can be formed by different synthetic resins and integrated by insert molding. In particular, since the top part 4a collides with the bump cushion 3 during maximum compression, the top part 4a is preferably formed by a reinforced synthetic resin material, in which glass fibers or carbon fibers are mixed into synthetic resin, in order to improve the durability and strength. The number of ribs 4c should be two or more, and in particular, if there are three or more ribs 4c, the bump stopper 4 can be stably fixed to the outer tube 1.

A metallic intermediate member 6 is disposed on the inside of the bump stopper 4 so as to contact the non-coated portion where the metal surface M of the outer tube 1 is exposed. As shown in FIGS. 2 and 3, the sacrificial corrosion part 5 is formed by plating on the outer surface of the intermediate member 6. Similar to the outer tube 1, the intermediate member 6 is made of an iron-based metal, and is integrated with the bump stopper 4 by insert molding. Specifically, the intermediate member 6 onto which the sacrificial corrosion part 5 has been plated is inserted into a mold for forming the bump stopper 4, and then a synthetic resin material that is the raw material of the bump stopper 4 is poured into the mold. As a result, the bump stopper 4, the intermediate member 6, and the sacrificial corrosion part 5 are integrated simultaneously with the formation of the bump stopper 4. The method for integration is not limited to insert molding, and the above three members can also be integrated by press fitting the intermediate member 6 into the inside of the bump stopper 4.

The sacrificial corrosion part 5 is made of a zinc-based metal, and has a higher ionization tendency than the iron-based metal that forms the outer tube 1 and the intermediate member 6. Therefore, the sacrificial corrosion part 5 corrodes with priority compared to the outer tube 1 and the intermediate member 6 that contact the sacrificial corrosion part 5, and thus corrosion of the outer tube 1 and the intermediate member 6 is suppressed. The sacrificial corrosion part 5 does not have to be provided over the entire outer surface of the intermediate member 6, and can be provided at only the portion of contact with the metal surface M of the outer tube 1. Further, the method for forming the sacrificial corrosion part 5 on the outer surface of the intermediate member 6 is not limited to plating, and other publicly-known coating methods such as spraying can be utilized. A zinc-based metal is a metal in which zinc is the main component or is pure zinc.

The intermediate member 6 shown in FIG. 2 is formed in a cap shape matching the bump stopper 4, and covers the metal surface M of the outer tube 1, which is the non-coated portion. The shape of the intermediate member 6 is not limited to that described above, and it is not necessary for the sacrificial corrosion part 5 to contact the entirety of the metal surface M of the outer tube 1. For example, the intermediate member 6 on which the sacrificial corrosion part 5 is plated can be constituted from a plurality of parts as shown in FIGS. 4 and 5.

Figure 4:
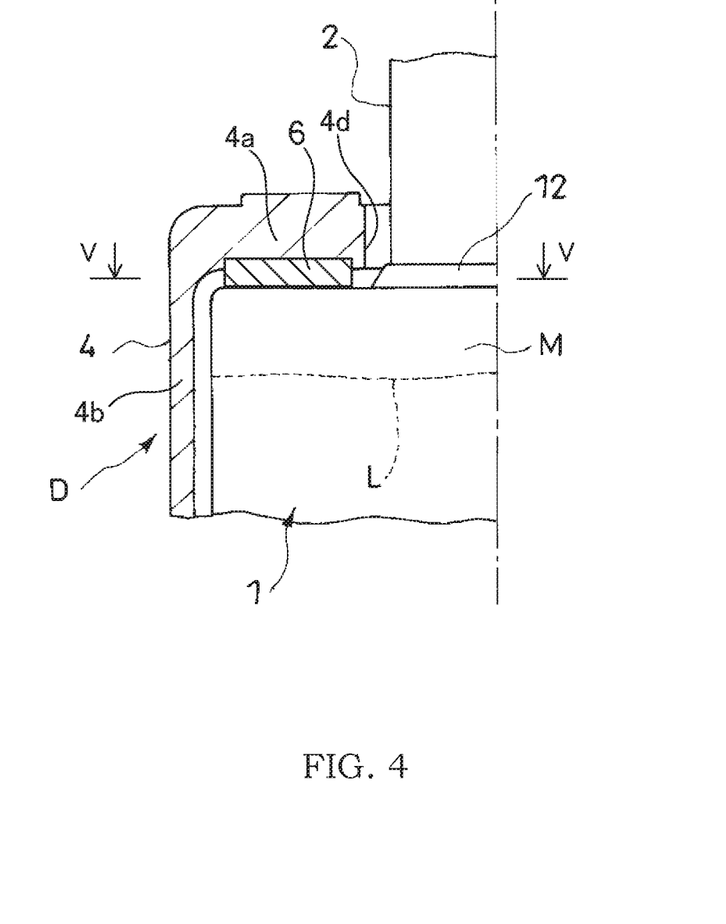
FIG. 4 is a partially cut-away enlarged front view of the essential parts of a shock absorber according to another embodiment of the present invention.
Figure 5:
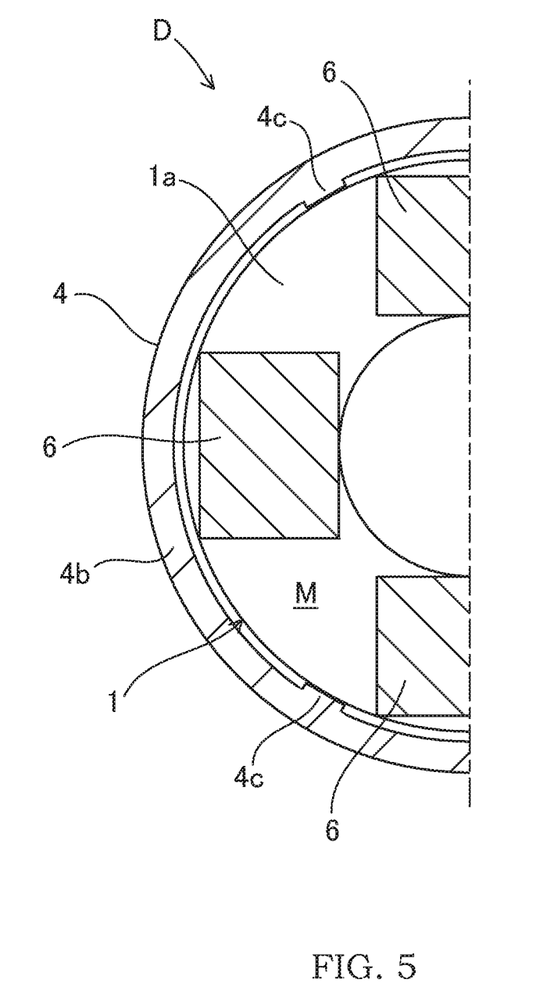
FIG. 5 is a cross-section view along line V-V in FIG. 4.

In the shock absorber D shown in FIGS. 4 and 5, the intermediate member 6 on which the sacrificial corrosion part 5 is plated is constituted by four rectangular shaped members disposed at intervals in the peripheral direction. A portion of each intermediate member 6 is embedded by insert molding in the bump stopper 4, and the intermediate members 6 are integrated with the bump stopper 4. The shape of the intermediate members 6 is not limited to a rectangle shape, and can be a geometrically simple shape such as a circle shape. The simpler the shape of the intermediate members 6, the easier and more inexpensive it is to form the intermediate members 6. Further, the number of intermediate members 6 is not limited to 4, and can be appropriately increased or decreased considering the rust prevention effect of the metal surface M.

Figure 6:
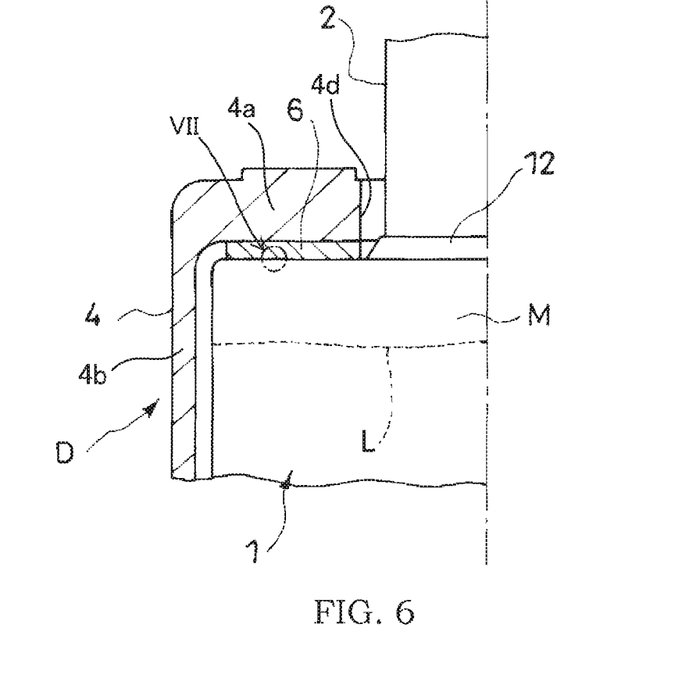
FIG. 6 is a partially cut-away enlarged front view of the essential parts of a shock absorber according to another embodiment of the present invention.
Figure 7:
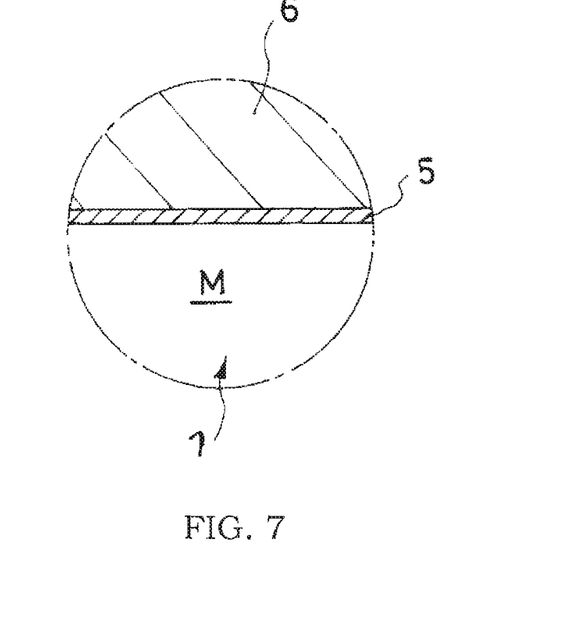
FIG. 7 is an enlarged view of a portion VII shown in FIG. 6.

The method for attaching the sacrificial corrosion part 5 is not limited to the above-described constitution. For example, as shown in FIGS. 6 and 7, the bump stopper 4 and the intermediate member 6 on which the sacrificial corrosion part 5 is plated can be formed separately and the intermediate member 6 can be retained by sandwiching it between the bump stopper 4 and the outer tube 1. In this case, by forming the intermediate member 6 in an annular ring shape, the operation for attaching it to the shock absorber D becomes easier. Further, this enables, for example, a commercially available zinc plated washer to be used as the intermediate member 6, and thus the shock absorber D can be manufactured inexpensively.

Hereinafter, the operational effects of the shock absorber D according to the embodiments of the present invention will be explained.

The outer tube 1 and the intermediate member 6 are formed by an iron-based metal, and the sacrificial corrosion part 5 is made of a zinc-based metal.

According to this constitution, since the sacrificial corrosion part 5 is a zinc-based metal, even if it corrodes, the corroded portion merely changes color to white. Thus, even if the sacrificial corrosion part 5 corrodes, it does not change color to reddish brown and corrosion products do not seep out as when iron corrodes, and thus the outer appearance does not deteriorate. Since the outer tube 1 is made of an iron-based metal, the outer tube 1 can be formed inexpensively and easily. In particular, when welding the peripheral components such as the bracket 10 or spring receiver 11 to the outer tube 1, the weldability of the outer tube 1 made of an iron-based metal and the peripheral components can be improved. Further, since the intermediate member 6 is made of an iron-based metal, the intermediate member 6 can be formed inexpensively and easily, and zinc plating serving as the sacrificial corrosion part 5 can be easily applied to the intermediate member 6.

The metals that form the outer tube 1, the intermediate member 6, and the sacrificial corrosion part 5 are not limited to those described above, as long as the ionization tendency of the metal forming the sacrificial corrosion part 5 is higher than the ionization tendency of the metal forming the outer tube 1 and the intermediate member 6. Further, as long as the ionization tendency is lower than that of the sacrificial corrosion part 5, the outer tube 1 and the intermediate member 6 can be formed by different materials.

The intermediate member 6 on which the sacrificial corrosion part 5 is formed is integrated with the bump stopper 4 by insert molding.

According to this constitution, when forming the bump stopper 4, the intermediate member 6 is attached to the bump stopper 4 and the bump stopper 4 and the sacrificial corrosion part 5 are integrated. Therefore, corrosion of the non-coated portion of the outer tube 1 can be reliably suppressed by the sacrificial corrosion part 5 without forgetting to interpose the sacrificial corrosion part 5 between the outer tube 1 and the bump stopper 4. Since the intermediate member 6 on which the sacrificial corrosion part 5 is plated is integrated with the bump stopper 4 by insert molding, the intermediate member 6 can be constituted by a plurality of parts, and the shape of the intermediate member 6 can be freely set.

The intermediate member 6 on which the sacrificial corrosion part 5 is formed is retained by sandwiching it between the bump stopper 4 and the outer tube 1.

According to this constitution, the operation for attaching the intermediate member 6 to the shock absorber D becomes easier. Also, if a commercially available zinc plated washer or the like is used as the intermediate member 6, the shock absorber D can be manufactured inexpensively.

The shock absorber D includes the intermediate member 6 that is interposed between the outer tube 1 and the bump stopper 4, and the sacrificial corrosion part 5 is formed on the surface of the intermediate member 6.

According to this constitution, since the sacrificial corrosion part 5 is formed on the surface of the intermediate member 6, the amount of metal to be used for forming the sacrificial corrosion part 5 can be reduced, and the shock absorber D can be manufactured inexpensively. Instead of using the intermediate member 6, a member formed by a zinc-based metal can be retained by sandwiching it between the outer tube 1 and the bump stopper 4, or adhered to the metal surface M of the outer tube 1. In this case, the intermediate member 6 can be eliminated.

The shock absorber D includes the sacrificial corrosion part 5 that is disposed between the outer tube 1 and the bump stopper 4 and contacts the metal surface M of the outer tube 1, and the sacrificial corrosion part 5 is made of a metal having a higher ionization tendency than that of the metal forming the outer tube 1.

According to this constitution, since the sacrificial corrosion part 5 that contacts the metal surface M of the outer tube 1 corrodes with priority compared to the non-coated part of the outer tube 1, corrosion of the non-coated portion can be suppressed. Basically, even if the end of the outer tube 1 to which the bump stopper 4 is fitted cannot be subjected to the same rust prevention treatment as the other portions and thus a portion where metal is exposed is formed, corrosion of this portion can be easily suppressed by providing the sacrificial corrosion part 5.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2013-210641 filed with the Japan Patent Office on Oct. 8, 2013, the entire contents of which are incorporated into this specification.

The invention claimed is:

1. A shock absorber, comprising:
   a metal cylindrical outer tube;
   a rod inserted into the outer tube, the rod being capable of moving in the axial direction;
   a bump cushion attached to an outer periphery of the rod that protrudes from the outer tube;
   a synthetic resin bump stopper formed in a cap shape and fitted to one end in the axial direction of the outer tube, the bump stopper being configured to be abutted by the bump cushion during maximum compression;
   a sacrificial corrosion part disposed between the outer tube and the bump stopper, the sacrificial corrosion part being configured to contact a metal surface of the outer tube; and
   an intermediate member interposed between the outer tube and the bump stopper,
   wherein the sacrificial corrosion part is formed on a surface of the intermediate member and is made of a metal having a higher ionization tendency than the outer tube.

2. The shock absorber according to claim 1, wherein the outer tube comprises a coated part to which a coating is applied and a non-coated part to which a coating is not applied and the metal surface is exposed, and the sacrificial corrosion part is disposed so as to contact the non-coated part.

3. The shock absorber according to claim 1, wherein the intermediate member on which the sacrificial corrosion part is formed is integrated with the bump stopper by insert molding.

4. The shock absorber according to claim 1, wherein the intermediate member on which the sacrificial corrosion part is formed is retained by sandwiching the intermediate member between the bump stopper and the outer tube.

5. The shock absorber according to claim 1, wherein the outer tube and the intermediate member are made of iron-based metal, and the sacrificial corrosion part is made of zinc-based metal.

* * * * *